July 29, 1952                    C. ADLER, JR                    2,605,384
                AIRCRAFT POSITION LAMP FOR PROJECTING A FULL
                     CIRCLE HIGH INTENSITY LIGHT SPREAD
Filed Aug. 13, 1951                                        3 Sheets-Sheet 2
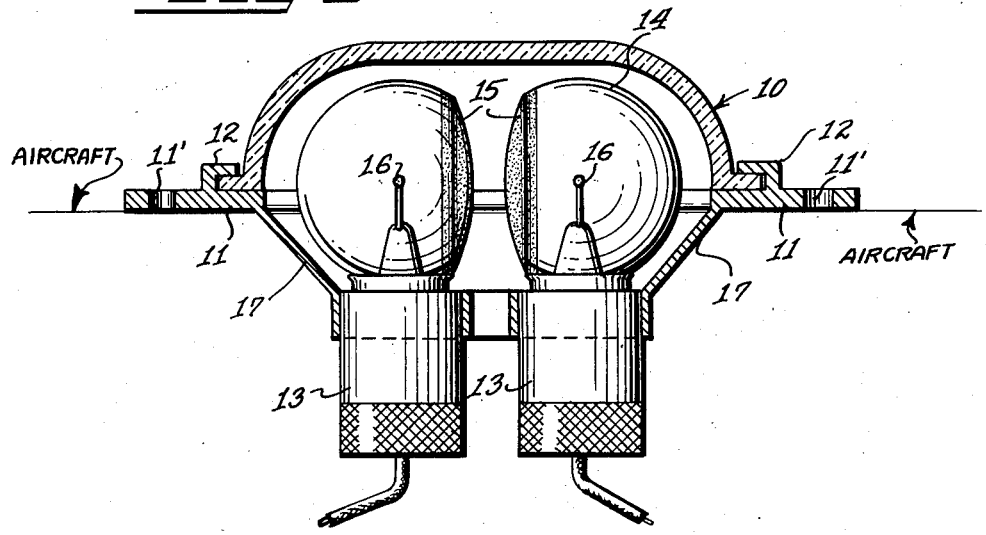
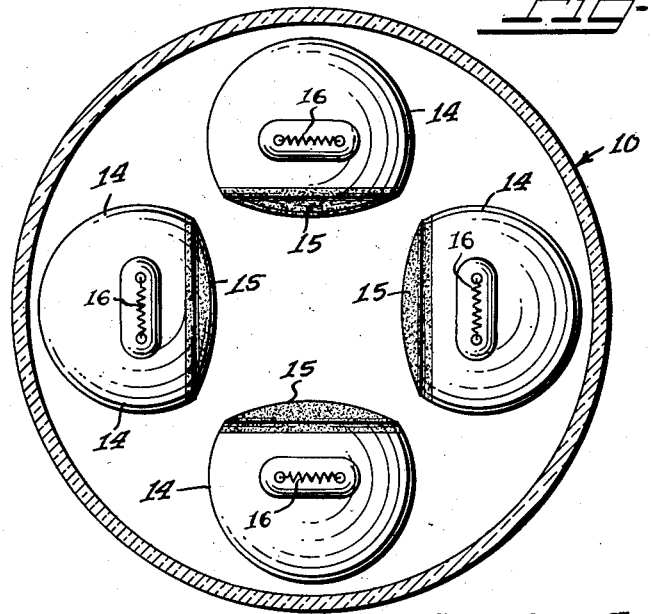
INVENTOR
*Charles Adler Jr.*
BY *Cushman, Darby & Cushman*
ATTORNEYS

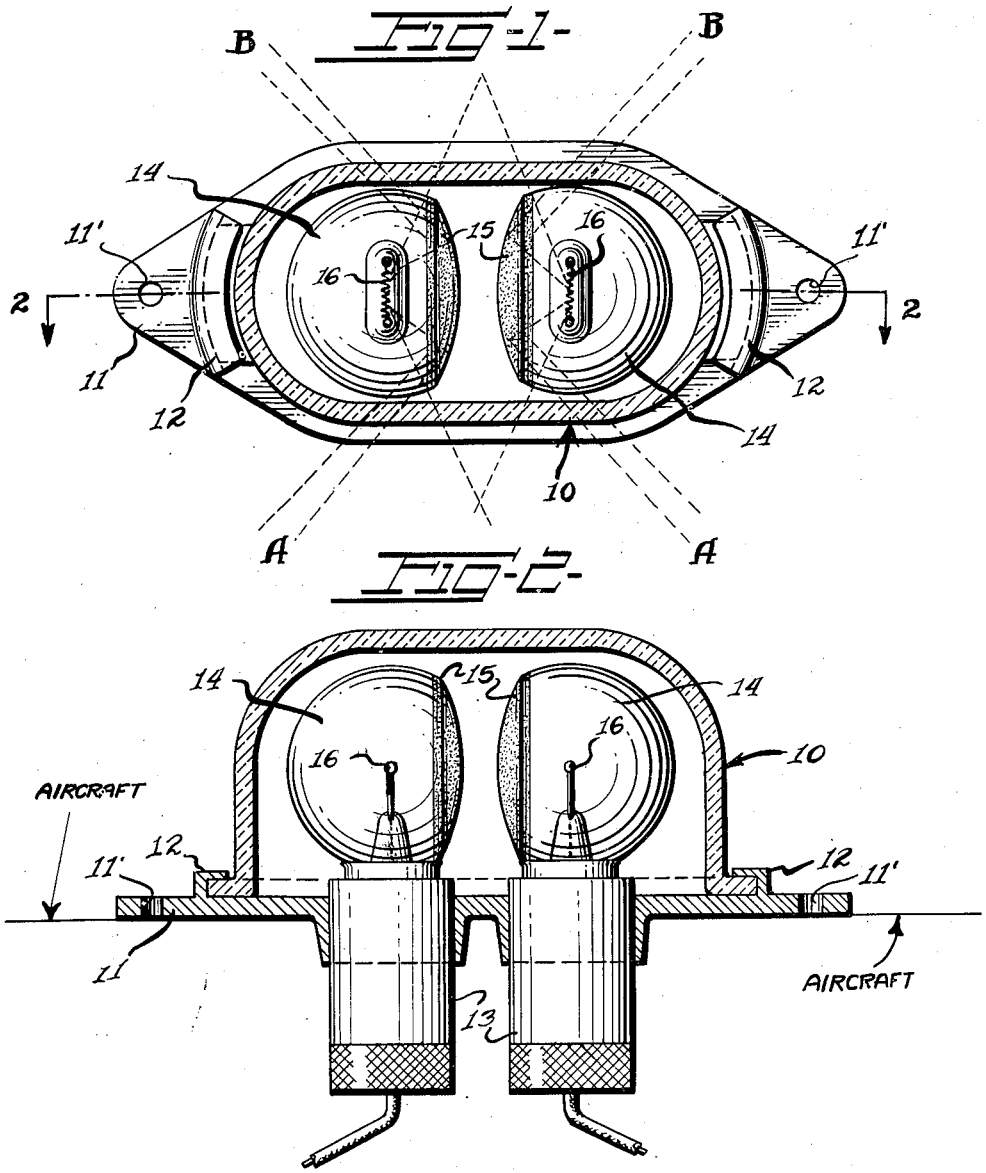

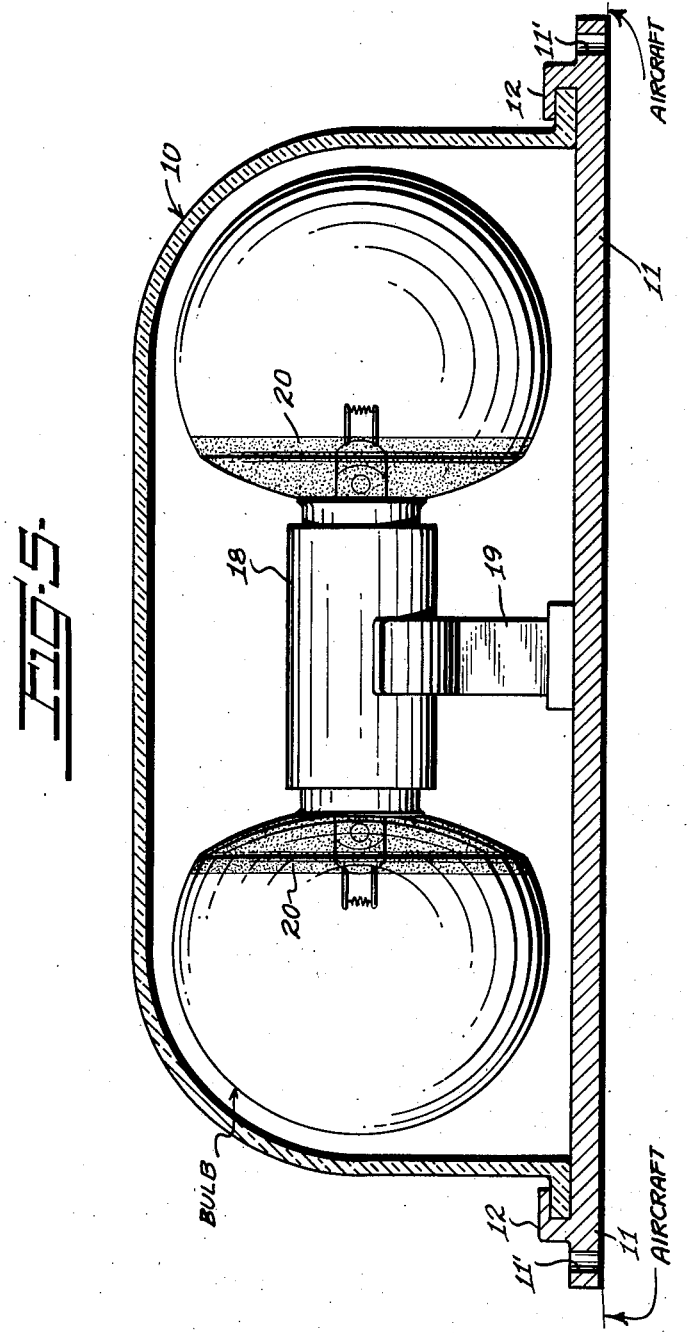

Patented July 29, 1952

2,605,384

UNITED STATES PATENT OFFICE 2,605,384

AIRCRAFT POSITION LAMP FOR PROJECTING A FULL CIRCLE HIGH INTENSITY LIGHT SPREAD

Charles Adler, Jr., Baltimore, Md.

Application August 13, 1951, Serial No. 241,676

2 Claims. (Cl. 240—7.7)

This invention relates to an improved position or anti-collision light which is particularly useful in connection with aircraft flying at night, one of the units being disposed above the fuselage and another below the same in accordance with the usual practice.

The great strides which have been made, and are being made, in promoting increased speed in aircraft have created a distinct safety problem. Various expedients have been suggested and, up to the present time, the most satisfactory fuselage lights are simply ordinary lamp bulbs enclosed in a protective housing. The disadvantage of such a fuselage light system is that it does not have an adequate range of visibility for the increased speed of modern aircraft and the higher projected speeds. That is, present fuselage lights do not have a sufficiently long range visibility in the zone of greatest danger, which is essential for the safety of high speed aircraft.

It is an important feature of this invention that the fuselage lights are uninterruptedly visible through 360°. At the same time, a maximum intensity of visible light, i. e., range of visibility, is presented about the zones of greatest danger.

Briefly, the zones of greatest danger are best understood by considering two aircraft in flight, either approaching each other head-on or following one another along flight paths which substantially coincide. In the first instance, if approaching aircraft are travelling on flight paths which substantially coincide, the danger of collision is greatest. The pilots must be warned of the presence of each other, in sufficient time, namely, when they are far enough apart, to allow them to alter course. That is, in this situation, the speed of travel frequently is doubled, as when each aircraft is travelling at about the same high speed, and the permissible time to modify course is thus halved, so that long range visibility is absolutely necessary to assure against collision.

In the second instance, if the aircraft are following one another along substantially coinciding flight paths, only the pilot of the following aircraft is aware of the leading aircraft and must take steps in sufficient time to avoid rear-end collision. Therefore, when the following aircraft is travelling at the greater speed and might overtake and collide with the leading aircraft, it is essential that the pilot of the following higher speed aircraft be warned at a sufficient distance so that he will be able to change course in time to avoid rear-end collision.

The present invention produces wide angle high beam candle power light visible for a long distance and over a wide area fore and aft and laterally of the aircraft, and hence, improves the safety factor under the severe conditions above described by assuring adequate warning of the pilots.

The light spread is wide enough, not only to take care of circumstances where the aircraft are travelling on coinciding flight paths, but of equal importance, the light will be visible in those cases where the aircraft are travelling in flight paths which are at an angle to one another, i. e., intersecting flight paths, and for a sufficient distance to warn the pilots and assure their altering course in time to avoid collision.

Referring to the drawings:

Figure 1 is a top view partly in elevation and partly in section.

Figure 2 is a sectional view along line 2—2 of Figure 1.

Figure 3 is a sectional view similar to Figure 2, of a modification.

Figure 4 is a diagrammatic top view partly in section of a further modification, and Figure 5 is a side view partly in section of an additional modification.

Referring to Figure 1, the numeral 10 designates a casing of any suitable light transmitting material. As shown, this casing is detachably held in any suitable manner to a base 11, as shown at 12. The base 11 carries conventional bayonet type lamp sockets 13, each adapted to receive the usual base of an electric lamp as shown in Figure 2. The sockets 13 will be spaced apart a distance to insure that when the lamps were inserted and turned to lock the bayonet connection there will be no interference by the lamps with their proper positioning.

Referring to Figure 2, a pair of lamps 14 each having a relatively shallow parabolic reflector 15 formed, for example, as by deposition of a reflective or silver coating on the glass bulb as shown is provided, and the bases of these lamps are positioned in the sockets 13 with the reflectors in opposed relation.

In use, the unit shown in Figure 1 is attached to either the underside of the fuselage of the aircraft or the upperside thereof or both in any suitable manner as by means of screws inserted in the openings 11' whereby the casing either depends from the bottom of the fuselage or extends upwardly from the top or both, and the lamps extend substantially vertically in parallel spaced relation.

Referring to Figures 1 and 2, it will be noted that each filament 16 of the lamps is disposed externally of the parabollic area comprehended by the reflectors 15. That is, the filaments 16 are preferably disposed on the axes of the reflectors at a point between the focal points of the reflectors and the reflectors. The lamps are disposed in longitudinal alignment as shown.

By reason of the construction just described, which represents a preferred form of this invention, the reflected light will be spread over a wide angle, for example, as illustrated at A—B, and will comprehend the zone of greatest danger in that the wide angle high beam candle power will be of the greatest intensity at positions where there is the minimum opportunity of approaching pilots to alter their course. In other words, the warning will be made visible at the greatest possible distance within the angle comprehended by the reflected light. This angle can, of course, be varied as desired, but preferably should not be less than a safe minimum in any event. To vary the angle of the reflected beam spread, the reflector may be made more shallow or the filament placed closer to the reflector, or both.

The filaments 16 are disposed in position so that direct light will be visible not only through the wide angles A—B, but from the sides of the unit as well, and the filaments always are in position with relation to the reflectors to produce the wide angle beams of reflected light. These results are attained by the use of shallow reflectors and exposed filaments, the focal points of the reflectors being sufficiently remote. As a consequence of this construction, the light is visible through 360° without interruption. While the visibility of the reflected light will be reduced as the unit is viewed toward an angle of 90°, this is compensated for by the combined intensities of the direct light from all of the exposed filaments 16. Hence, the visibility of the light of this invention is substantially increased over that available at the present time.

Referring to Figure 3, the construction is similar to that of Figures 1 and 2, except that the base 11 is extended downwardly to form an enclosure or casing as shown at 17 in which a portion of the lamps is countersunk, whereby the height of the casing 10 is reduced and its projection above or below the fuselage is correspondingly reduced to lessen aerodynamic drag.

Referring to Figure 4, the constructions shown in Figures 1 and 2 or 3 are embodied in a unit having four lamps in diametric opposed relation with their non-reflecting portions also disposed in opposed relation, and enclosed in a light transmitting casing 10 which is substantially circular. It will be observed that in this construction the visible light at any time will be composed of the direct light from two filaments as well as reflected light from at least one filament.

Referring to Figure 5, the lamps are horizontally mounted as distinguished from being vertically mounted as shown in Figure 1. A central dual socket 18 is provided for receiving the lamp bases and this socket, in turn, is mounted in a bracket 19 supported on the base 11. Also, in this construction, the reflecting area 20 of each lamp is deposited on the glass bulb concentric with the base of the lamp as shown.

It will be observed that in all cases, the reflectors are in opposed relation and are relatively shallow, and the filaments are exposed but positioned between the focal point of the reflector and the reflector, and on the axis thereof.

Also, in all cases the light intensity will vary from (1) that created by direct light from two filaments as when a unit as shown in Figures 1 to 3 and 5 is viewed from the side to (2) that created by the direct light and reflected light from one lamp as when the same is viewed directly in Figures 1 to 3 and 5, and to (3) that created by the direct light and the reflected light from at least two lamps when the unit shown in Figure 4 is viewed at an angle relative to any two lamps and to (4) that created by the direct light from two filaments and the direct and reflected light from a third lamp as where the latter is viewed directly in Figure 4. In every instance, the light from the unit will be visible uninterruptedly through an angle of 360°, and while the greatest intensity would be that created by both reflected and direct beams, the range of visibility of the unit when viewed from the side is substantial, since it will be the sum of the direct light from at least two filaments.

While I have referred in this specification to an uninterrupted light spread through the light transmitting cover of 360°, and this refers to the horizontal light spread, it is to be understood that this condition is equally true from the standpoint of vertical light spread to the extent that the light spread is not obscured by the presence of the base 11 and fuselage of the airplane.

I claim:

1. An elecric light unit for mounting in an aircraft fuselage having independent electric lamps disposed in spaced relation, a base in which said lamps are mounted, a reflector having a concave reflecting surface on the bulb of each lamp, said reflecting surface facing the filament light source of each lamp, non-reflecting surfaces of said reflectors being in opposed spaced relation and a light-transmitting cover enclosing said lamps, said unit producing direct beams and reflected beams to provide an uninterrupted light spread through said cover of 360°, the filaments being located between the focal points of their respective concave reflectors and the reflectors.

2. An electric light unit for mounting in an aircraft fuselage having independent electric lamps disposed in spaced relation, a base in which said lamps are mounted, a reflector having a concave reflecting surface on the bulb of each lamp, said reflecting surface facing the filament light source of each lamp, non-reflecting surfaces of said reflectors being in opposed spaced relation and a light-transmitting cover enclosing said lamps, said unit producing direct beams and reflected beams to provide an uninterrupted light spread through said cover of 360°, the filaments being located between the focal points of their respective concave reflectors and the reflectors, a portion of the bulb of each lamp being disposed below the open edge of the cover whereby the projection of the cover above the fuselage is reduced to lessen aerodynamic drag.

CHARLES ADLER, Jr.

REFERENCES CITED

The following references are of record in the file of this patent:

UNITED STATES PATENTS

| Number | Name | Date |
|---|---|---|
| 1,889,725 | Adler, Jr. | Nov. 29, 1932 |
| 2,365,504 | Adler, Jr. | Dec. 19, 1944 |
| 2,375,075 | Carruth | May 1, 1945 |